United States Patent
Lee et al.

(10) Patent No.: US 8,565,393 B2
(45) Date of Patent: Oct. 22, 2013

(54) HOME APPLIANCE AND HOME APPLIANCE SYSTEM

(75) Inventors: Phal Jin Lee, Changwon-si (KR); Hoi Jin Jeong, Changwon-si (KR); Jong Hye Han, Changwon-si (KR); Young Soo Kim, Changwon-si (KR); In Haeng Cho, Changwon-si (KR); Si Moon Jeon, Changwon-si (KR)

(73) Assignee: LG Electronics Inc., Seoul (KR)

( * ) Notice: Subject to any disclaimer, the term of this patent is extended or adjusted under 35 U.S.C. 154(b) by 581 days.

(21) Appl. No.: 12/431,903

(22) Filed: Apr. 29, 2009

(65) Prior Publication Data

US 2009/0323914 A1    Dec. 31, 2009

Related U.S. Application Data

(60) Provisional application No. 61/048,780, filed on Apr. 29, 2008.

(30) Foreign Application Priority Data

Apr. 29, 2008   (KR) .................. 10-2008-0040024
Apr. 27, 2009   (KR) .................. 10-2009-0036631

(51) Int. Cl.
   *H04M 11/00*   (2006.01)
(52) U.S. Cl.
   USPC ............ 379/106.01; 379/106.07; 379/106.11; 379/93.37; 340/679
(58) Field of Classification Search
   USPC ............ 379/106.01, 106.07, 106.11, 102.01, 379/102.07, 102.04, 93.37, 37, 90.01, 9.04, 379/92.01, 92.03, 92.04; 340/53, 679, 340/310.06, 310.08
   See application file for complete search history.

(56) References Cited

U.S. PATENT DOCUMENTS

| | | | |
|---|---|---|---|
| 3,910,322 | A | 10/1975 | Hardesty et al. |
| 4,146,754 | A | 3/1979 | Rose |
| 4,766,505 | A | 8/1988 | Nakano et al. |
| 4,897,659 | A | 1/1990 | Mellon |
| 4,977,394 | A | 12/1990 | Manson et al. |

(Continued)

FOREIGN PATENT DOCUMENTS

| | | |
|---|---|---|
| CN | 1212304 | 3/1999 |
| CN | 1393672 | 1/2003 |

(Continued)

OTHER PUBLICATIONS

International Search Report dated Aug. 23, 2010 (Application No. PCT/KR2010/000319).

(Continued)

*Primary Examiner* — Vivian Chin
*Assistant Examiner* — Leshui Zhang
(74) *Attorney, Agent, or Firm* — KED & Associates LLP

(57) ABSTRACT

A home appliance and a home appliance system are disclosed. Product information and status information of the home appliance are converted into at least one transmission acoustic signal, and a sound corresponding to the at least one transmission acoustic signal is output to the outside. The product information and status information are formed as a digital signal and stored in a storage device. The digital signal is encoded through a conversion device, and converted into at least one transmission acoustic signal. The at least one transmission acoustic signal is formed as an analog signal. Meanwhile, the at least one transmission acoustic signal can be dividedly formed.

10 Claims, 9 Drawing Sheets

(56) References Cited

U.S. PATENT DOCUMENTS

| | | | |
|---|---|---|---|
| 5,103,214 | A | 4/1992 | Curran et al. |
| 5,210,784 | A | 5/1993 | Wang et al. |
| 5,268,666 | A | 12/1993 | Michel et al. |
| 5,452,344 | A | 9/1995 | Larson |
| 5,506,892 | A | 4/1996 | Kojima et al. |
| 5,664,218 | A | 9/1997 | Kim et al. |
| 5,757,643 | A | 5/1998 | Kuroda et al. |
| 5,774,529 | A | 6/1998 | Johannsen et al. |
| 5,864,828 | A | 1/1999 | Atkins |
| 5,939,992 | A | 8/1999 | Devries et al. |
| 5,940,915 | A | 8/1999 | Nam ................................. 8/159 |
| 5,987,105 | A * | 11/1999 | Jenkins et al. ............ 379/106.01 |
| 6,121,593 | A | 9/2000 | Mansbery et al. |
| 6,759,954 | B1 | 7/2004 | Myron et al. |
| 6,763,458 | B1 | 7/2004 | Watanabe et al. ............. 713/100 |
| 6,778,868 | B2 | 8/2004 | Imamura et al. |
| 6,870,480 | B2 | 3/2005 | Suzuki et al. |
| 6,906,617 | B1 | 6/2005 | Van der Meulen |
| 7,135,982 | B2 | 11/2006 | Lee ................. 340/635 |
| 7,243,174 | B2 | 7/2007 | Sheahan et al. |
| 7,266,164 | B2 | 9/2007 | Jeon et al. |
| 7,280,643 | B2 | 10/2007 | Howard et al. ............ 379/93.37 |
| 7,337,457 | B2 | 2/2008 | Pack et al. ........................ 725/40 |
| 7,363,031 | B1 | 4/2008 | Aisa |
| 7,439,439 | B2 | 10/2008 | Hayes et al. ..................... 84/600 |
| 7,509,824 | B2 | 3/2009 | Park et al. .................... 68/12.23 |
| 7,631,063 | B1 | 12/2009 | Ho et al. |
| 7,648,476 | B2 | 1/2010 | Bock et al. |
| 7,653,512 | B2 | 1/2010 | Cheung et al. ................ 702/184 |
| 7,750,227 | B2 | 7/2010 | Hayes et al. |
| 7,843,819 | B1 | 11/2010 | Benveniste |
| 7,965,632 | B2 | 6/2011 | Sugaya |
| 8,027,752 | B2 | 9/2011 | Castaldo et al. |
| 8,040,234 | B2 | 10/2011 | Ebrom et al. ................. 340/531 |
| 8,045,636 | B1 | 10/2011 | Lee et al. |
| 8,132,049 | B2 | 3/2012 | Yasukawa et al. |
| 8,204,189 | B2 | 6/2012 | Rhodes et al. |
| 8,325,054 | B2 | 12/2012 | Kim et al. |
| 8,391,255 | B2 | 3/2013 | Ribiere et al. |
| 8,428,910 | B2 | 4/2013 | Papadimitriou et al. |
| 2002/0029575 | A1 | 3/2002 | Okamoto |
| 2002/0032491 | A1 | 3/2002 | Imamura et al. |
| 2002/0078742 | A1 | 6/2002 | Kim ................................. 73/162 |
| 2002/0097161 | A1 | 7/2002 | Deeds |
| 2002/0116959 | A1 | 8/2002 | Ohta et al. |
| 2002/0120728 | A1* | 8/2002 | Braatz et al. .................. 709/223 |
| 2003/0028345 | A1 | 2/2003 | Watkins et al. |
| 2003/0110363 | A1 | 6/2003 | Bachot et al. |
| 2003/0128850 | A1 | 7/2003 | Kimura et al. |
| 2003/0167782 | A1 | 9/2003 | Roh et al. |
| 2003/0196492 | A1 | 10/2003 | Remboski et al. .............. 73/593 |
| 2004/0032853 | A1 | 2/2004 | D'Amico et al. |
| 2004/0132444 | A1 | 7/2004 | Herrmann |
| 2004/0158333 | A1 | 8/2004 | Ha et al. |
| 2004/0211228 | A1 | 10/2004 | Nishio et al. |
| 2004/0249903 | A1 | 12/2004 | Ha et al. |
| 2004/0261468 | A1 | 12/2004 | Lueckenbach |
| 2005/0015890 | A1 | 1/2005 | Kim et al. |
| 2005/0029976 | A1 | 2/2005 | Terry et al. |
| 2005/0086979 | A1 | 4/2005 | Son et al. |
| 2005/0129200 | A1 | 6/2005 | Forrest et al. ............. 379/93.37 |
| 2005/0134472 | A1 | 6/2005 | Jang et al. |
| 2005/0162909 | A1 | 7/2005 | Wooldridge |
| 2006/0048405 | A1 | 3/2006 | Baek et al. |
| 2006/0066758 | A1 | 3/2006 | Higashihara |
| 2006/0089818 | A1 | 4/2006 | Norell et al. |
| 2006/0136544 | A1 | 6/2006 | Atsmon et al. |
| 2006/0168740 | A1 | 8/2006 | Ha et al. |
| 2006/0259199 | A1 | 11/2006 | Gjerde et al. |
| 2007/0113595 | A1 | 5/2007 | Harwood et al. |
| 2007/0137265 | A1 | 6/2007 | Shikamori et al. |
| 2007/0175883 | A1 | 8/2007 | Miu et al. |
| 2007/0189323 | A1 | 8/2007 | Swoboda et al. |
| 2007/0219756 | A1 | 9/2007 | Frankel et al. |
| 2007/0272286 | A1 | 11/2007 | Curtius et al. |
| 2008/0036619 | A1 | 2/2008 | Rhodes et al. |
| 2008/0072383 | A1 | 3/2008 | Bextermoller et al. |
| 2008/0122648 | A1 | 5/2008 | Ebrom et al. |
| 2009/0067102 | A1 | 3/2009 | Cline et al. |
| 2009/0160637 | A1 | 6/2009 | Maeng |
| 2009/0169434 | A1 | 7/2009 | Ogusu |
| 2009/0282308 | A1 | 11/2009 | Gutsche et al. |
| 2009/0323914 | A1 | 12/2009 | Lee et al. |
| 2010/0037401 | A1 | 2/2010 | Bae et al. |
| 2010/0116060 | A1 | 5/2010 | Murayama ..................... 73/593 |
| 2011/0022358 | A1 | 1/2011 | Han et al. |
| 2011/0060553 | A1 | 3/2011 | Han et al. |
| 2011/0200189 | A1 | 8/2011 | True et al. |

FOREIGN PATENT DOCUMENTS

| | | |
|---|---|---|
| EP | 0 038 687 | 10/1981 |
| EP | 0510519 | 10/1992 |
| EP | 0 617 557 A2 | 9/1994 |
| EP | 0 742 308 | 11/1996 |
| EP | 0 846 991 | 6/1998 |
| EP | 0 851 054 | 7/1998 |
| EP | 0691060 | 5/2004 |
| JP | 4-358497 | 12/1992 |
| JP | 11-127254 | 11/1999 |
| JP | 2001-345949 | 12/2001 |
| JP | 2001-353395 | 12/2001 |
| JP | 2002-000988 | 1/2002 |
| JP | 2002-011274 | 1/2002 |
| JP | 2002-045590 A | 2/2002 |
| JP | 2002-85887 | 3/2002 |
| JP | 2002-162149 | 6/2002 |
| JP | 2002-279091 | 9/2002 |
| JP | 2007-267956 | 10/2007 |
| JP | 2008-003562 | 1/2008 |
| KR | 10-1991-0020404 A | 12/1991 |
| KR | 10-1996-0003308 A | 1/1996 |
| KR | 10-1997-0019443 A | 4/1997 |
| KR | 10-0127232 | 10/1997 |
| KR | 10-0143209 | 8/1998 |
| KR | 20-1999-0040564 U | 12/1999 |
| KR | 20-0162050 | 12/1999 |
| KR | 10-2000-0018678 | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-0039959 | 5/2002 |
| KR | 10-2004-0050767 | 6/2004 |
| KR | 10-2004-0095017 | 11/2004 |
| KR | 10-2005-0062747 A | 6/2005 |
| KR | 10-2005-0097282 A | 10/2005 |
| KR | 10-0564761 | 3/2006 |
| KR | 10-2006-0103014 | 9/2006 |
| KR | 10-0641974 | 11/2006 |
| KR | 10-2007-0013090 | 1/2007 |
| KR | 10-2008-0068447 | 7/2008 |
| KR | 10-0887575 | 3/2009 |
| KR | 10-2010-0112950 | 10/2010 |
| KR | 10-2011-0010378 | 2/2011 |
| WO | WO 01/11575 | 2/2001 |
| WO | WO 2005/106096 | 11/2005 |
| WO | WO 2008/010670 | 1/2008 |

OTHER PUBLICATIONS

International Search Report dated Dec. 1, 2010 (PCT/KR2010/002211).
International Search Report dated Dec. 1, 2010 (PCT/KR2010/002222).
International Search Report dated Dec. 18, 2009.
International Search Report dated Dec. 21, 2009.
International Search Report dated Jan. 4, 2010.
PCT International Search Report dated May 26, 2011 issued in Application No. PCT/KR2010/005108.
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001;

(56) References Cited

OTHER PUBLICATIONS

Piscataway, NJ; IEEE, vol. 4; Nov. 5, 2001; pp. 2083-2086 (XP010566758).
European Search Report dated Oct. 14, 2011 issued in Application No. 09 73 8950.
U.S. Office Action issued in U.S. Appl. No. 12/432,111 dated May 2, 2012.
European Search Report dated May 8, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
Russian Office Action dated Feb. 7, 2012. (with translation).
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
International Search Report dated Apr. 25, 2011 issued in Application No. PCT/KR 2010/004407.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
Russian Office Action issued in Application No. 2010144513/08 dated Jun. 27, 2012.
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
International Search Report issued in Application No. PCT/KR2011/000311 dated Jul. 28, 2011.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/432,184 dated Aug. 7, 2012.
Korean Office Action dated Aug. 13, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
European Search Report dated Dec. 17, 2012.
European Search Report dated Jan. 2, 2013.
Ethem M Sözer; "Simulation and Rapid Prototyping Environment for Underwater Acoustic Communications: Reconfigurable Modem"; Oceans—Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
U.S. Appl. No. 12/431,893, filed Apr. 29, 2009.
U.S. Appl. No. 12/431,910, filed Apr. 29, 2009.
U.S. Appl. No. 12/432,111, filed Apr. 29, 2009.
U.S. Appl. No. 12/432,132, filed Apr. 29, 2009.
U.S. Appl. No. 12/551,827, filed Sep. 1, 2009.
U.S. Appl. No. 12/757,339, filed Apr. 9, 2010.
U.S. Appl. No. 12/568,022, filed Sep. 28, 2009.
U.S. Appl. No. 12/757,205, filed Apr. 9, 2010.
U.S. Appl. No. 12/757,213, filed Apr. 9, 2010.
U.S. Appl. No. 12/757,232, filed Apr. 9, 2010.
U.S. Appl. No. 12/757,246, filed Apr. 9, 2010.
U.S. Appl. No. 12/603,810, filed Oct. 22, 2009.
U.S. Appl. No. 12/432,184, filed Apr. 29, 2009.
U.S. Appl. No. 13/382,334, filed Jan. 5, 2012.
U.S. Appl. No. 12/842,649, filed Jul. 23, 2010.
U.S. Appl. No. 12/842,679, filed Jul. 23, 2010.
U.S. Appl. No. 12/846,013, filed Jul. 29, 2010.
U.S. Appl. No. 12/846,040, filed Jul. 29, 2010.
U.S. Appl. No. 12/847,272, filed Jul. 30, 2010.
U.S. Appl. No. 12/847,303, filed Jul. 30, 2010.
U.S. Appl. No. 12/847,406, filed Jul. 30, 2010.
U.S. Appl. No. 12/847,284, filed Jul. 30, 2010.
U.S. Appl. No. 12/847,306, filed Jul. 30, 2010.
U.S. Appl. No. 12/850,240, filed Aug. 4, 2010.
U.S. Appl. No. 13/522,066, filed Jul. 13, 2012.
U.S. Appl. No. 13/562,704, filed Jul. 31, 2012.
U.S. Appl. No. 13/588,164, filed Aug. 17, 2012.
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
U.S. Notice of Allowance issued in U.S. Appl. No. 12/847,303 dated Jan. 11, 2013.
U.S. Office Action issued in U.S. Appl. No. 12/757,246 dated Jan. 17, 2013.
U.S. Office Action issued in U.S. Appl. No. 12/431,893 dated Jan. 29, 2013.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.

(56) References Cited

OTHER PUBLICATIONS

U.S. Office Action issued in U.S. Appl. No. 12/847,406 dated Jul. 9, 2013.
U.S. Office Action issued in U.S. Appl. No. 12/847,306 dated Jul. 9, 2013.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/757,339 dated Sep. 6, 2013.

* cited by examiner

| Version | Product ID | Diagnosis Data |
|---|---|---|
| 1 Byte | 7 Bytes | 52 Bytes |

| Version | Protocol Name |
|---|---|
| 0x01 | Smart Diagnosis for Washing Machine v1.0 |

| Packet |
|---|

| Frame | Frame | Frame | Frame |
|---|---|---|---|

| Header | | | | Payload |
|---|---|---|---|---|
| Fram Type[7:6] | Reserved [5:4] | Length [3:0] | FCS | |
| 1 Byte | | | 1 Byte | 1 ~ 15 Byte |

FIG. 8
| Preamble | Header | TS_H | Payload | Stuff | TS_P | IFS |
|---|---|---|---|---|---|---|
| 16 sym | 32 sym | 4 sym | 12 ~ 180 sym | N sym | 4 sym | 16 sym |
Header: 1/2 Code Rate & Interleaving
Payload: 2/3 Code Rate & Interleaving
FIG. 9
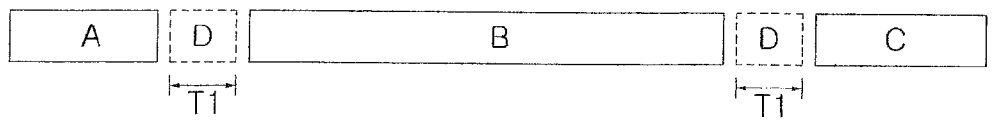
FIG. 10
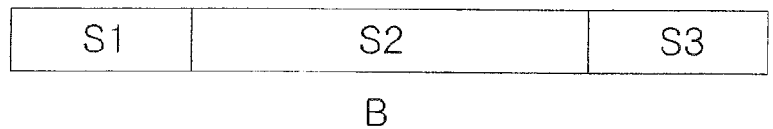

HOME APPLIANCE AND HOME APPLIANCE SYSTEM

This application claims priority to U.S. Provisional Application No. 61/048,780, filed Apr. 29, 2008, Korea Application No. 10-2008-0040024 filed in Korea on Apr. 29, 2008, and Korea Application No. 10-2009-0036631 filed in Korea on Apr. 27, 2009, which are hereby incorporated by reference.

BACKGROUND

1. Field

A home appliance and a home appliance system are disclosed herein.

2. Background

Home appliances and home appliance systems are known. However, they suffer from various disadvantages.

BRIEF DESCRIPTION OF THE DRAWINGS

Embodiments will be described in detail with reference to the following drawings in which like reference numerals refer to like elements, and wherein:

FIG. 8 is a conceptual diagram showing a process for converting each second packet of FIG. 7 into a transmission acoustic signal;

FIG. 9 is a conceptual diagram showing the divided transmission acoustic signals output from a conversion device of FIG. 2;

FIG. 10 is a conceptual diagram showing an embodiment of part B of FIG. 9;

DETAILED DESCRIPTION

Figure 1:
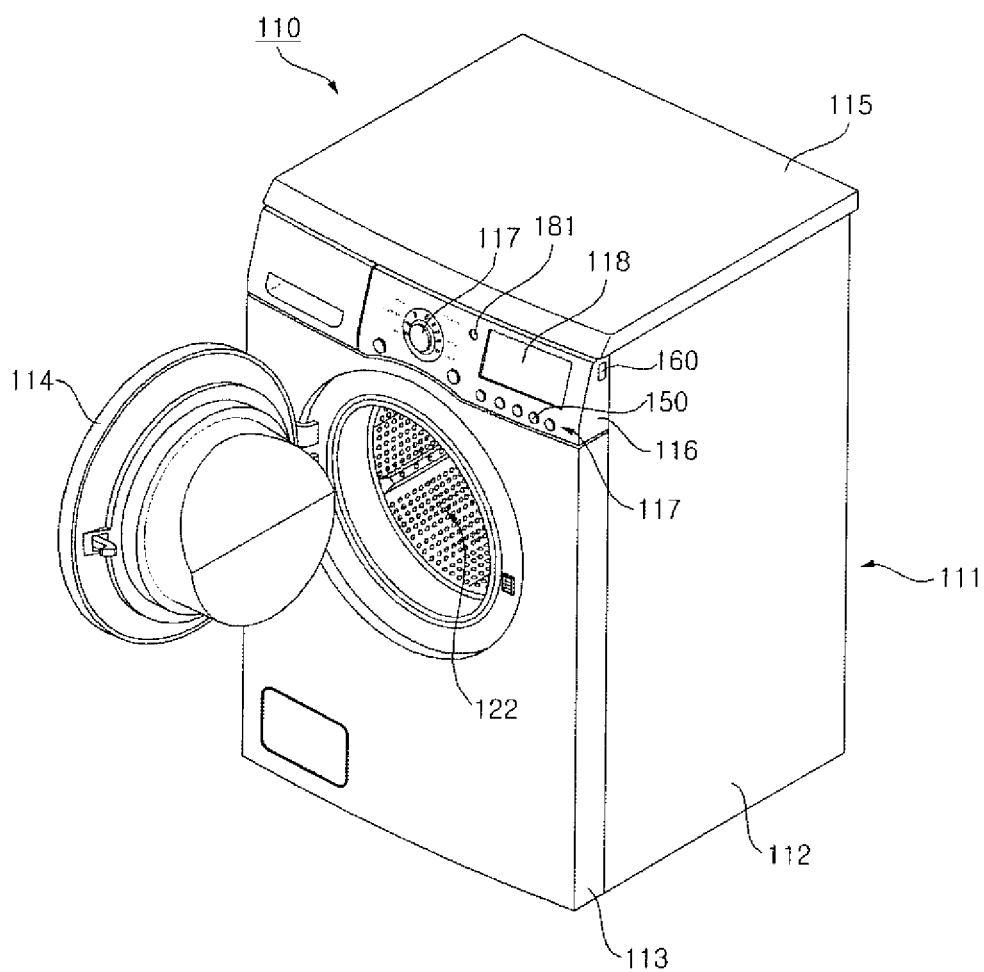
FIG. 1 is a perspective view showing an embodiment of a laundry treatment machine which is an embodiment of a home appliance according to the present invention.

Conventionally, when problems with home appliances occur, users usually call a service center to ask a repairman to come for repairs. However, the repairman's visit to the user's home incurs excessive costs, and often it is not easy to deal with problems when doing repairs because no information was provided prior to the visit. With technological development, the technique of remotely diagnosing fault information by using a telephone network has been developed.

European Patent No. 0510519 discloses a technique of sending fault information of a home appliance to a service center by using a telephone network via a modem connected to the home appliance. With this technique, the modem must be connected to the home appliance. However, a home appliance, such as a laundry treatment machine, may be installed outdoors, and thus, there are location restrictions that must be considered when connecting the laundry treatment machine and the telephone network.

U.S. Pat. No. 5,987,105 discloses a technique of converting fault information of a home appliance into a sound of an audible frequency band by using a telephone network and sending the same to a service center via a telephone. However, with this technique, signal interference may occur depending on the surrounding environment when converting the fault information of the home appliance into the sound of an audible frequency and then sending the same to a telephone handset. Data loss may occur depending on the characteristics of the telephone network. Moreover, conventional home appliances have the problem that, since they do not inform users of the point in time when the fault information is output, they cannot correctly transmit the fault information.

Moreover, in the conventional home appliance and home appliance system the entire product information and status information was transmitted as a transmission acoustic signal output to outside of the home appliance. In the case of damage to the product information and status information, the entire product information and status information has to be re-transmitted. However, the conventional home appliance system was unable to receive the product information and status information, just determine that the product information and status information are damaged and request the home appliance re-transmit the product information and status information. Subsequently, there is the problem that in the case of damage to the product information and status information, a lot of time and energy is consumed to re-transmit the product information and status information.

Embodiments disclosed herein are directed to a home appliance and a home appliance system. Embodiments of a home appliance and a home appliance system will be described using a laundry treatment machine and a laundry treatment machine system as examples. However, embodiments are not limited to a laundry treatment machine and laundry treatment machine system, but rather, are applicable to other home appliances. Such home appliances may include, for example, a TV, an air conditioner, a washing machine, a refrigerator, an electric rice cooker, or a microwave or conventional oven.

FIG. 1 is a front perspective view of a laundry treatment machine according to an embodiment. Referring to FIG. 1, the laundry treatment machine 110 may include a cabinet 111, a tub 122 disposed inside the cabinet 111 that performs washing of laundry, a motor (not shown) that drives the tub 122, a washing fluid supply device (not shown) that supplies washing fluid to the tub 122, and a drainage device (not shown) that discharges washing fluid from the laundry treatment machine 110 after the washing is completed. The cabinet 111 may include a cabinet body 112, a cabinet cover 113 coupled to the cabinet body 112, a control panel 116 disposed on the cabinet cover 114 to control operation of the laundry treatment machine 110, and a top plate 115. The cabinet cover 113 may include a hole 121 through which laundry may be put into/removed from the tub 122 and a door 114 that rotates to open and close the hole 121.

Figure 2:
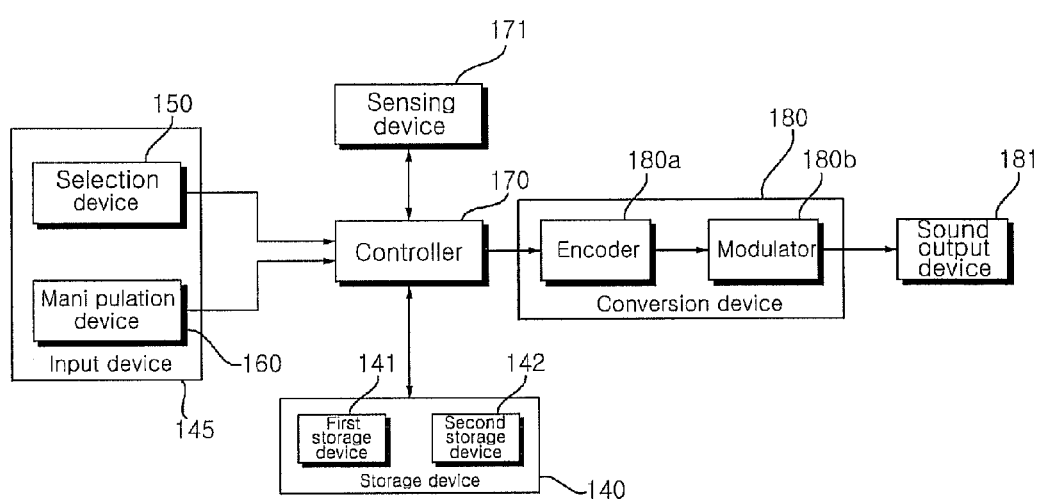
FIG. 2 is a block diagram showing a control flow of the laundry treatment machine of FIG. 1.
Figure 3:
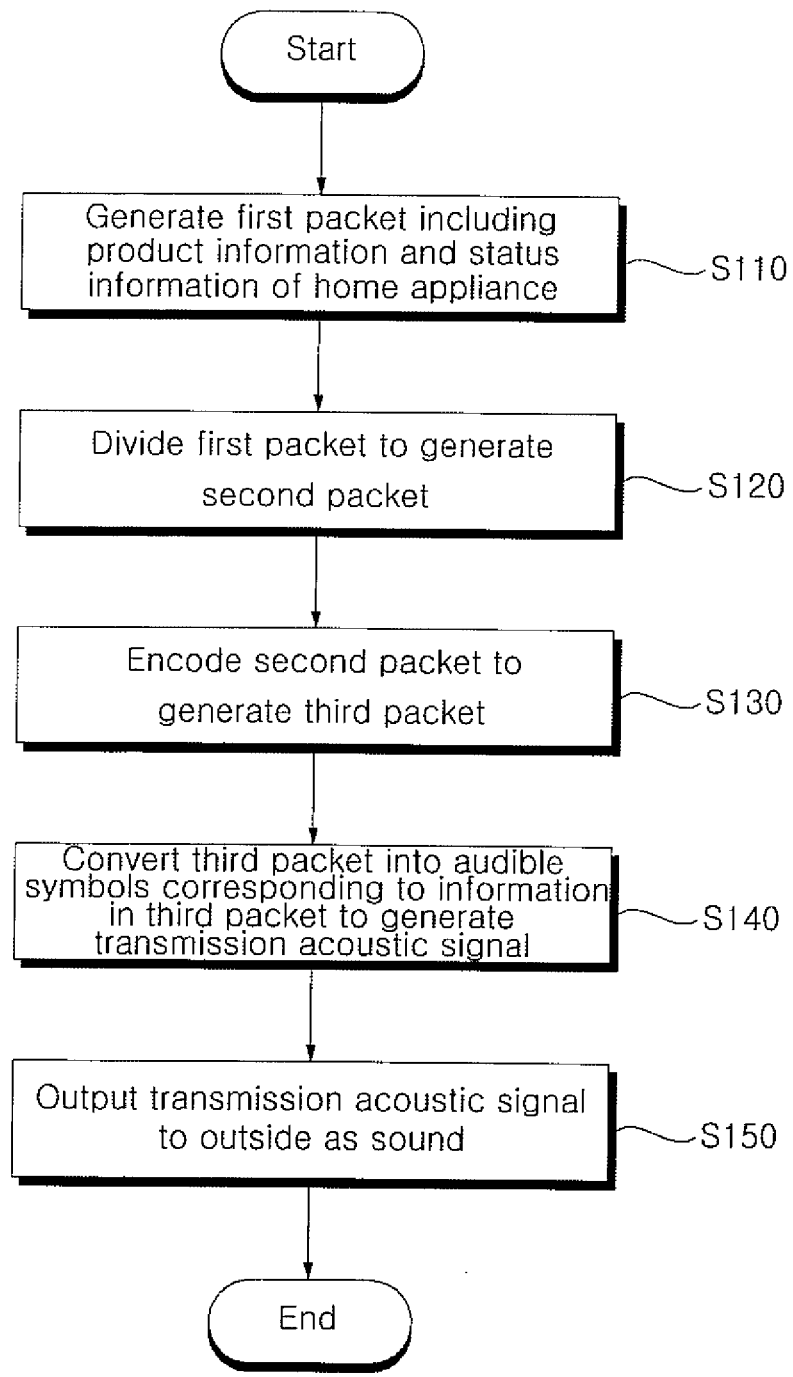
FIG. 3 is a flowchart showing a control flow of the laundry treatment machine of FIG. 1.

FIG. 2 is a block diagram showing a control flow of the laundry treatment machine 110 of FIG. 1, and FIG. 3 is a flowchart showing a control flow of the laundry treatment machine 110 of FIG. 1.

Referring to FIGS. 2 and 3, the laundry treatment machine 110 may include a conversion device 180 that converts a second packet into at least one transmission acoustic signal and outputs the signal, a sound output device 181 that outputs a sound corresponding to the at least one transmission acoustic signal output from the conversion device 180 to the outside, a selection device 150 that receives input of an operation external command signal from the outside, and a controller 170 that performs control to divide a first packet into predetermined unit frames, encode the predetermined unit frames to generate the second packets, transmit the second packets to the conversion device 180, and dividedly transmit the at least one transmission acoustic signal output from the conversion device 180.

The input device 145 may further include a selection device 150 configured to receive an external command signal from a user. In the case that the selection device 150 is included, the controller 170 may control the selection device 150 such that, if the user inputs the external command signal through the selection device 150, the at least one transmission acoustic signal may be dividedly transmitted. It is noted that the external command signal may be input by the user via the selection device 150 or may be another signal received from outside of the laundry treatment machine 110. If the external command signal is input as another signal from outside of the laundry treatment machine 110, the external command signal may be selected from among a sound and a transmission acoustic signal, for example.

Further, the laundry treatment machine 110 may also include a storage device 140 that stores the product information and status information. In the case that the storage device 140 is included, if the user inputs the external command signal through the selection device 150, the controller 170 performs control to generate the product information and status information stored in the storage device 140 as the first packet, divide the first packet into second packets, transmit the second packets to the conversion device 180, convert the second packets into the at least one transmission acoustic signal, and output the signal. The storage device 140 may be variously formed. That is, the storage device 140 may include a first storage device 141 that stores data even when the power supply is cut, and a second storage device 142 that erases internal data when the power supply is cut. The first storage device 141 stores the product information and status information necessary for the fault diagnosis. Conversely, the second storage device 142 temporarily stores data sensed by the sensing device 171 or data input by the user using a manipulation device 160. For example, the first storage device 141 may be variously selected from EEPROM, PROM and EPROM, and the second storage device 142 may be variously selected from DRAM and SRAM.

The conversion device 180 may include an encoder 180a and a modulator 180b. The encoder 180a may encode the second packet into the third packet. The modulator 180b may modulate the third packet onto an analog signal. The third packet, e.g. the at least one transmission acoustic signal, may then be output to the sound output device 181. The sound output device 181 may receive the third packet, e.g. the at least one transmission acoustic signal, and output the same as a sound.

The modulator 180b may modulate the third packet using, for example, any one of a frequency shift keying method, an amplitude shift keying method, or a phase shift keying method. The frequency shift keying method is a modulation method that modulates a data value of the product information and status information onto a signal of a predetermined frequency. The amplitude shift keying method is a modulation method that varies a level of amplitude in response to a data value. The phase shift keying method is a modulation method that varies a phase according to a data value of the product information and status information.

When the laundry treatment machine 110 is operated, product information and status information for the laundry treatment machine 110 may be generated. The product information and status information may be sent to the controller 170. The product information and status information may be made up of unit signals. Further, the product information and status information may include at least one of operation information, fault information and user information for the laundry treatment machine 110. The operation information may include information required for the operation of the laundry treatment machine 110, such as information about a washing stroke, a spinning stroke, and a rinsing stroke of the laundry treatment machine 110. The fault information may be variously selected from an error code corresponding to the fault information, information of the controller 170, a value sensed by the sensing device 171, a sensed value of the motor, fault information of the washing fluid supply device, and fault information of the drainage device. The user information may variously include the number of times of using the laundry treatment machine 110 by the user, a course set by the user, and option setting information set in the laundry treatment machine 110. That is, the user information may include the contents input by the user while using the laundry treatment machine 110, or initial setting information of the laundry treatment machine 110. In addition, the product information and status information are stored having sizes of the following table.

TABLE 1

| Category | Name | Size (unit) |
| --- | --- | --- |
| Operation info | Status | 1 |
|  | Common | 11 |
|  | Wash | 4 |
|  | Rinse | 4 |
|  | Spin | 6 |
|  | Dry | 8 |
|  | Error code | 1 |
| User info | Counter | 8 |
|  | Options | 9 |

The data of the above Table 1 will be explained. 'Category' represents categories of the product information and status information, and 'Name' represents meanings of each category. Hereinafter, the data will be explained in detail. 'Status' represents the last stroke of the overall strokes of the laundry treatment machine 110. That is, when the laundry treatment machine 110 performs the washing stroke, the spinning stroke and the rinsing stroke, if the user sets the rinsing stroke as the last one, 'Status' represents product information in the rinsing stroke. Here, 'Status' has a size of 1 byte. 'Common' represents product information to be sampled during the overall strokes of the laundry treatment machine 110. That is, when the motor and the washing fluid supply device are operated during the overall strokes of the laundry treatment machine 110, 'Common' represents product information at a predetermined time point or in each stroke. 'Common' is set having a size of 11 bytes. Also, 'Wash' represents product information to be sampled in the washing stroke. For example, when the washing stroke is performed. 'Wash' represents product information to be sampled, such as a water level of washing fluid or an operation time of the washing fluid supply device. 'Wash' is set having a size of 4 bytes. 'Rinse' represents product information to be sampled in the rinsing stroke. 'Rinse' is formed having a size of 4 bytes. In addition, 'Spin' represents product information to be sampled in the spinning stroke. Here, 'Spin' is set having a size of 6 bytes. 'Dry' represents product information to be sampled in the drying stroke. 'Dry' is formed having a size of 8 bytes. Meanwhile, 'Error code' represents a code of an error generating a warning, when a problem is sensed during the operation of the laundry treatment machine 110. That is, 'Error code' represents an error code displayed to the outside so that the user can recognize a problem of the laundry treatment machine 110. For example, when the laundry treatment machine 110 has a fault or error in use, 'Error code' may be an error message or buzzer output to the outside through a display device (not shown) or buzzer. Here, 'Error code' is formed having a size of 1 byte. In the meantime, 'Counter' represents product information including the number of times of using the laundry treatment machine 110 by the user and the number of times of error occurrence. 'Counter' is formed having a size of 8 bytes. Moreover, 'Options' represents product information including a variety of options set by the user, when recently operating the laundry treatment machine 110. The user set 'Options' in the laundry treatment machine 110. The user may set 15 minutes for the washing time, 5 minutes for the spinning time and 10 minutes for the rinsing time. Here, 'Options' is formed having a size of 9 bytes. On the other hand, 'size', 'Category' and 'Name' explained above are merely an embodiment. Therefore, 'Size', 'Category' and 'Name' may be differently set according to characteristics of a home appliance.

Meanwhile, as described above, when the user inputs the external command signal, the controller 170 loads the product information and status information from the first storage device 141. The controller 170 combines the product information and status information to generate a first packet including the product information and status information of the laundry treatment machine 110 (S110). Also, when completing generation of the first packet, the controller 170 divides the first packet into predetermined unit frames. After dividing the first packet into the predetermined unit frames, the controller 170 encodes the predetermined unit frames to generate second packets. When the controller 170 transmits the second packet to the conversion device 180, the second packet is transmitted to the encoder 180a. The encoder 180a encodes the second packet to generate a third packet. The encoder 180a transmits the third packet to the modulator 180b. The modulator 180b converts the third packet into audible symbols in each bit of the third packet to generate a transmission acoustic signal (S130). The transmission acoustic signal is output to the outside, including the product information and status information of the laundry treatment machine 110.

Additionally, the user may input an external command signal through the selection device 150. When the external command signal is input, the controller 170 may control the at least one transmission acoustic signal converted and output by the conversion device 180 so that the user may be notified or made aware of the outputting of the sound. The configuration of the at least one transmission acoustic signal will be described below in detail.

Figures 4, 5, 6, 7:
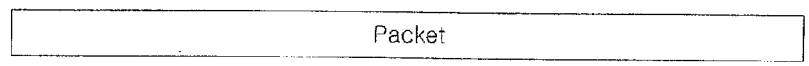
FIG. 4 is a conceptual diagram showing a first packet transmitted from a controller 170 of FIG. 2.
FIG. 5 is a conceptual diagram showing an embodiment of a program version of FIG. 4.
FIG. 6 is a conceptual diagram showing a process for converting the first packet of FIG. 4 into a plurality of frames.
FIG. 7 is a conceptual diagram showing each second packet of FIG. 6.

FIG. 4 is a conceptual diagram showing the first packet transmitted from the controller 170 of FIG. 2, and FIG. 5 is a conceptual diagram showing an embodiment of a program version of FIG. 4.

Referring to FIGS. 4 and 5, the controller 170 loads the product information and status information, and transmits a control signal to the conversion device 180. Here, the transmitted control signal includes one first packet. That is, the controller 170 forms the product information and status information as one first packet. After generating the one first packet, the controller 170 divides the first packet into predetermined frame units and encodes the frames to generate second packets. The construction of the first packet will be explained. The first packet may include a plurality of data. The plurality of data include 'Program Version' required for the fault diagnosis, 'Product ID' needed to identify a product of the laundry treatment machine 110, and 'Diagnosis Data' including the product information and status information. Also, each data is designed according to a necessary capacity. For example, 'Program Version' may be formed as 1 byte, 'Product ID' may be formed as 7 bytes, and 'Diagnosis Data' may be formed as 52 bytes. That is, the first packet is formed having an overall size of 60 bytes. Here, since the size of the first packet mentioned above is merely an embodiment, the first packet can be variously formed. The program version and the product ID are input directly to the controller 170. Conversely, the diagnosis data are stored in the first storage device 141. Accordingly, when the user starts the fault diagnosis, the controller 170 loads the diagnosis data from the first storage device 141. The controller 170 combines the program version and product ID input thereto and the diagnosis data stored in the first storage device 141, thereby generating the first packet including the product information and status information. On the other hand, the program version displays 'Version' and 'Protocol Name'. For example, when 'Version' is expressed as '0x01', 'Protocol Name' means 'Smart Diagnosis for Washing Machine v1.0'.

FIG. 6 is a conceptual diagram showing a process for converting the first packet of FIG. 4 into the plurality of frames. FIG. 7 is a conceptual diagram showing each second packet of FIG. 6.

Referring to FIGS. 6 and 7, the first packet is divided into four frames via the controller 170. Here, when the first packet is divided into the four frames, the product information and status information are dividedly included in the four frames. In the meantime, the first packet and the frames may be differently formed according to a design. That is, the first packet may include five frames according to a design. Also, the first packet may include six frames according to a design. After dividing the first packet into the four frames, the controller 170 encodes the respective frames to generate second packets. The generated second packet will be explained. The second packet is formed as a first header and a first payload. The first header is formed having a size of 2 bytes, and the first payload is formed having a size of 1 to 15 bytes. That is, the first header includes a characteristic of the second packet. Here, the first payload may be varied according to a frame size. On the contrary, the first payload includes frame contents included in the second packet. The first header includes Frame Type, Payload Length, Reserved and Frame Check Sequence (FCS). Here, 'Frame Type' is formed having a size of 2 bits, 'Reserved' is formed having a size of 2 bits, and 'Length' of the first payload is formed having a size of 4 bits. In addition, 'FCS' is formed having a size of 1 byte. Therefore, the first header is formed having a size of 2 bytes. It will be described concretely. 'Frame Type' represents a type of the second packet. 'Frame Type' uses 2 bits to express the type of the second packet. That is, 'Frame Type' expresses the type of the second packet using 6th and 7th bits. For example, when 'Frame Type' represents '00', the second packet means a start portion of the first packet. Also, when 'Frame Type' represents '01', the second packet means a middle portion of the first packet. On the contrary, when 'Frame Type' represents '11', the second packet means an end portion of the first packet. Accordingly, when the second packets are combined, the sequence of the respective second packets can be distinguished using 'Frame Type'. Meanwhile, 'Length' of the first payload represents a first payload length in byte units. In addition, 'Length' of the first payload is expressed using 0th, 1st, 2nd and 3rd bits. For example, when 'Length' of the first payload has a value of '1', it means that the first payload has a size of 1 byte. Conversely, when 'Length' of the first payload has a value of '5', it means that the first payload has a size of 5 bytes. Moreover, 'FCS' checks an error of the frame. A CRC-8 method may be used to check an error of the frame via 'FCS'. 'Reserved' is for the use in inserting necessary contents in design. 'Reserved' is expressed using 4th and 5th bits. In the meantime, the first packet data are encoded in the first payload. That is, as set forth herein, the controller 170 divides the first packet into the four frames. When the second packets are formed, the respective frames are encoded and inserted into the first payloads. Also, the first payload divided from the first packet may be formed having a size of minimum 1 byte to maximum 15 bytes. Therefore, the divided first payload is formed having a maximum size of 15 bytes, and the second packet is formed having a maximum size of 17 bytes, including the first header.

FIG. 8 is a conceptual diagram showing a process for converting each second packet of FIG. 7 into the transmission acoustic signal.

Referring to FIG. 8, the controller 170 transmits the second packet to the conversion device 180. The transmitted second packet is encoded in the conversion device 180 and output as the transmission acoustic signal. The conversion device 180 may include the encoder 180a that encodes the second packet and transmits the third packet, and the modulator 180b that receives the third packet, and converts the third packet into audible symbols in each bit of the third packet to generate the transmission acoustic signal. The encoding and conversion methods will be explained. The encoder 180a encodes the first header using ½ code rate, interleaving and Forward Error Correction Code (FEC). In addition, the encoder 180a encodes the first payload using ⅔ code rate, interleaving and FEC. When the first header has been encoded, 2 byte encoded first header is generated in every one byte of the first header. Moreover, when the first payload has been encoded, 3 byte encoded first payload is generated in every two bytes of the first payload. When the encoder 180a encodes the second packet into the third packet and transmits the third packet to the modulator 180b, the modulator 180b converts the third packet into audible symbols in each bit to generate the transmission acoustic signal. In the meantime, the above process is nothing but an embodiment, and thus may be variously implemented. That is, the encoder 180a may receive the first packet from the controller 170, generate the second packet, and encode the second packet into the third packet. Further, the controller 170 may generate the third packet and converts the third packet via the modulator 180b. Therefore, the present invention is not limited to the above embodiment. Hereinafter, for convenience of explanation, the conversion device 180 will be explained based on the above role.

Meanwhile, the conversion device 180 converts the second packet which is a digital signal into at least one transmission acoustic signal B which is an analog signal. Here, the conversion device 180 converts bit information of the second packet into audible symbols to use an audible sound frequency band. At this time, since the transmission acoustic signal converted into the audible symbols may be damaged by ambient noise or loss, the bit information is not sent as it is. That is, when the bit information is sent, it is converted into an FEC. It is thus possible to restore the lost audible symbols. Also, a tail symbol is additionally generated as a result of FEC encoding. That is, since a second header and a second payload are encoded using ½ code rate and ¾ code rate, respectively, the tail symbol is generated twice. The interleaving process is performed to a stuff symbol that adjusts alignment of 32 audible symbols, except the tail symbol. In the meantime, the at least one transmission acoustic signal B includes a plurality of transmission acoustic signals.

On the other hand, the process for converting the second packet into the at least one transmission acoustic signal B will be explained. The conversion device 180 generates a preamble notifying output of the transmission acoustic signal converted from the second packet, before converting the first header. The preamble may be formed in various patterns. For example, the pattern of the preamble may be '0x0FF0'. Meanwhile, the preamble can be formed merely when the firstly-formed second packet is converted into the at least one transmission acoustic signal. After generating the preamble, the modulator 180b converts the first header into the second header. The contents included in the second packet are converted into an analog signal and added to the second header. After ending conversion of the second header, the conversion device 180 generates a Tail Symbol for Header (TS_H) to correct an error when it occurs while the second packet is converted into the second header. Therefore, in a case where the conversion signal H is converted into the at least one transmission acoustic signal B, it includes the second header and the TS_H. In the meantime, the process for converting the first header into the second header and the TS_H converts one hit of the second packet into the transmission acoustic signal formed of two audible symbols. That is, the process for converting the first header into the second header and the TS_H undergoes processes such as ½ code rate, interleaving and FEC. As a result, in the first header, two audible symbols are generated in every one bit of the second packet. Meanwhile, in the first header, one audible symbol is generated in every one bit of the third packet. For example, the first header of the second packet has a size of 2 bytes, which is equivalent to 16 bits. The conversion device 180 converts the 16 bit first header into the second header formed of transmission acoustic signals including 32 audible symbols. Here, the TS_H is formed in the modulator 180b via calculation so as to judge whether the first header has been accurately converted into the second header. The TS_H is additionally generated as a result of FEC encoding. In the meantime, since the conversion method is merely an embodiment, the conversion can be carried out in various manners. That is, one bit of the second packet may be converted into a transmission acoustic signal including three audible symbols, or one bit of the second packet may be converted into a transmission acoustic signal including four audible symbols. Therefore, it can be variously formed according to a user's design.

Meanwhile, when completing conversion of the first header, the conversion device 180 starts conversion of the first payload. Here, the process for converting the first payload into a second payload, a stuff and a Tail Symbol for Payload (TS_P) undergoes processes such as ⅔ code rate, interleaving and FEC. Accordingly, unlike conversion of the first header, when the conversion device 180 converts the first payload into the second payload, 2 bits of the second packet are converted into three audible symbols.

At this time, the conversion device 180 converts the first payload into the second payload in units of 32 audible symbols. When the first payload has a size of 1 byte, the first payload is converted into the second payload including 12 audible symbols. Here, since the second payload must include total 32 audible symbols, it is lack of 20 audible symbols. In this case, the stuff including 20 audible symbols fills up the lack portion. That is, the stuff is varied according to a size of the second payload. As a method for calculating the stuff, the size of the second payload is divided by 32, and the resulting value is subtracted from 32 audible symbols, thereby calculating the audible symbols. For example, when the first payload is converted into 12 audible symbols, the stuff is formed of 20 audible symbols to compensate for deficient audible symbols, so that the second payload can be composed of 32 audible symbols. In addition, when the first payload is converted into 170 audible symbols, the stuff is formed of 22 audible symbols. If the second payload is formed of 170 audible symbols, the second payload cannot be aligned as 32 audible symbols. The stuff is formed of 22 audible symbols to fill up the deficient portion of the second payload. That is, the stuff fills up the deficient portion such that the total number of the audible symbols constituting the second payload can be a multiple of 32. Accordingly, the second payload can be aligned as 32 audible symbols. In the meantime, since the second payload is converted from the first payload, it is formed including minimum 12 audible symbols to maximum 180 audible symbols. Here, the second payload is varied according to a size of the first payload. Meanwhile, when completing conversion of the second payload, the conversion device 180 generates the TS_P to check an error in the conversion of the first payload and correct the error. The TS_P is additionally generated as a result of FEC encoding. Moreover, after converting the second packet into the at least one transmission acoustic signal B, the conversion device 180 generates an Inter Frame Space (IFS) to distinguish the frames. The IFS serves to distinguish the respective second packets, and provide the conversion device 180 a preparation time for conversion of the succeeding second packet. Further, the IFS includes a time for preventing signal attenuation caused by a noise filter of a cellular phone. Meanwhile, before generating the IFS, the conversion device 180 may insert a conversion signal end transmission acoustic signal (not shown) notifying the end of the second payload.

The conversion process is not limited to the above explanation, and is nothing but an embodiment. That is, the conversion process may be independently performed in the conversion device 180. Also, the conversion process may be performed in the encoder 180a and the modulator 180b. The conversion process is not limited thereto, but may be implemented in various manners. Therefore, the conversion process includes all processes and devices that convert the product information and status information into the at least one transmission acoustic signal and output the signal to the outside as a sound.

The conversion device 180 converts the second packet into the at least one transmission acoustic signal, and outputs the signal to the sound output device 181. The user can input the operation external command signal through the selection device 150. When the operation external command signal is input, the controller 170 controls the at least one transmission acoustic signal converted and output by the conversion device 180 so that the user can recognize the sound output. The construction of the at least one transmission acoustic signal will be explained below in detail.

FIG. 9 is a conceptual view showing divided transmission acoustic signals A, B, and C output from the conversion device of FIG. 2. FIG. 10 is a conceptual view showing an embodiment of the transmission acoustic signal B of FIG. 9.

Hereinafter, like reference numerals indicate like elements even in different embodiments.

Referring to FIGS. 10 and 9, when the external command signal is input, the controller 170 may control the conversion device 180 and the sound output device 181 such that a first or start transmission acoustic signal A is output through the conversion device 180 to the user, before a second or main transmission acoustic signal B corresponding to the product information and status information is output, so that a user is notified that the second or main transmission acoustic signal B corresponding to the product information and status information is about to be output. After the start transmission acoustic signal A is output, the controller 170 controls the conversion device 180 to output the transmission acoustic signal B. Further, after the transmission acoustic signal B is output, the controller 170 controls the conversion device 180 to output a third or end transmission acoustic signal C so that the user is notified that output of the transmission acoustic signal B has been completed. Meanwhile, a sound corresponding to the start transmission acoustic signal A and a sound corresponding to the end transmission acoustic signal C may include at least one of a voice recognizable by the user, a melody, or a buzzer sound. The sound corresponding to the start transmission acoustic signal A and the sound corresponding to the end transmission acoustic signal C are not limited to the above-described sounds, but may include any sound which notifies or makes the user aware that the at least one transmission acoustic signal B is about to be output or the outputting is completed.

The controller 170 may control the conversion device 180 to output a separation signal D to separate the start transmission acoustic signal A, the at least one transmission acoustic signal B, and the end transmission acoustic signal C during a dummy time T1. Therefore, the user may be made aware that the at least one transmission acoustic signal B is output and completed, thus preventing or avoiding damage to the at least one transmission acoustic signal during the outputting of the at least one transmission acoustic signal B.

The at least one transmission acoustic signal B may include a first transmission acoustic signal S1 containing contents of the product information and status information of the laundry treatment machine 110, a second transmission acoustic signal S2 output upon completion of the first transmission acoustic signal S1 and corresponding to the product information and status information of the laundry treatment machine 110, and a third transmission acoustic signal S3 output upon completion of the second transmission acoustic signal S2 and indicating completion of the outputting of the product information and status information. That is, the first transmission acoustic signal S1 may contain basic contents, such as an equipment number of the laundry treatment machine 110 and the contents of the product information and status information and a header., that allows an external recognition device to recognize that the at least one transmission acoustic signal S2 is to be output. That is, the first transmission acoustic signal S1 includes a preamble, a second header and a TS-H. The second transmission acoustic signal S2 may contain the information corresponding to the product information and status information. The product information and status info nation may include operation info nation or fault information for the laundry treatinent machine 110. The operation information may include information required for the operation of the laundry treaunent machine 110, such as info nation about a washing stroke, a spinning stroke, and a rinsing stroke of the laundry treatment machine 110. The fault information may be variously selected from fault info nation generated during each operation of the laundry treatment machine 110 and mechanical fault information of the laundry treatment machine 110. That is, the second transmission acoustic signal S2 includes a second payload, a stuff and a TS-P. Meanwhile, the third transmission acoustic signal S3 may inform that output of the second transmission acoustic signal S2 containing the product information and status info nation has been completed. That is, the third transmission acoustic signal S3 may include a conversion signal end acoustic signal. Therefore, when an external device recognizes the third transmission acoustic signal S3, the external device may be made aware of the completion of the output the second transmission acoustic signal S2.

Figure 11:
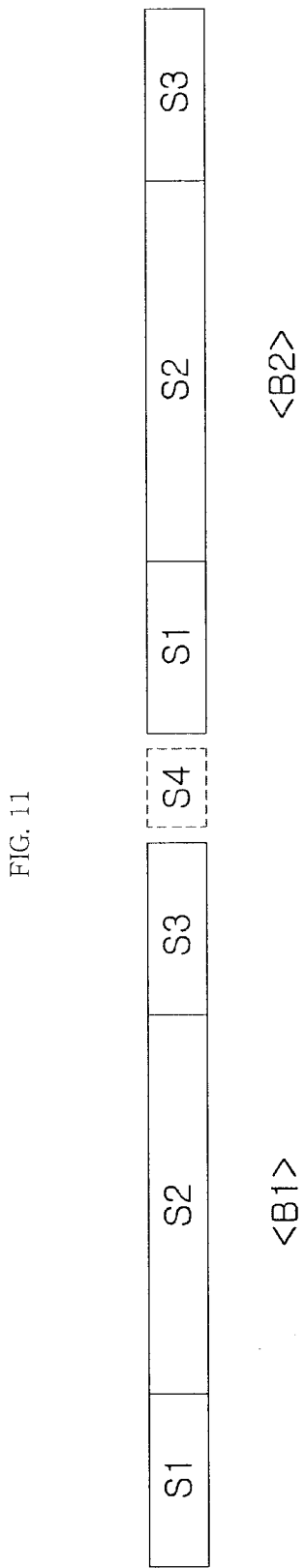
FIG. 11 is a conceptual diagram showing another embodiment of part B of FIG. 9.

FIG. 11 is a conceptual view showing another embodiment of the transmission acoustic signal B of FIG. 9. Like reference numerals have been used to indicate like elements, and repetitive disclosure has been omitted.

Referring to FIG. 1, the at least one transmission acoustic signal B may include a plurality of transmission acoustic signals B1 and B2. The plurality of transmission acoustic signals B1 and B2 may include an operation information transmission acoustic signal B1 containing operation information and a fault information transmission acoustic signal B2 containing fault information of the laundry treatment machine 110. Further, the operation information transmission acoustic signal B1 and the fault information transmission acoustic signal B2 each may include a first transmission acoustic signal S1, a second transmission acoustic signal S2, and a third transmission acoustic signal S3. The first transmission acoustic signal S1, the second transmission acoustic signal S2, and the third transmission acoustic signal 53 may have the same or similar functions as those described with respect to FIG. 4. The controller 170 may control the conversion device 180 to output a separation signal S4 during a dummy time T2 between the operation information transmission acoustic signal B1 and the fault information transmission acoustic signal B2 in order to separate the plurality of transmission acoustic signals B1 and B2. The conversion device 180 may output at least one transmission acoustic signal B by dividing it into an operation information transmission acoustic signal B1 and a fault information transmission acoustic signal B2. The conversion device 180 may be able to output the fault information transmission acoustic signal B2, even if the operation information transmission acoustic signal B1 is damaged, so that it is only necessary to re-output the operation information transmission acoustic signal B1.

Figure 12:
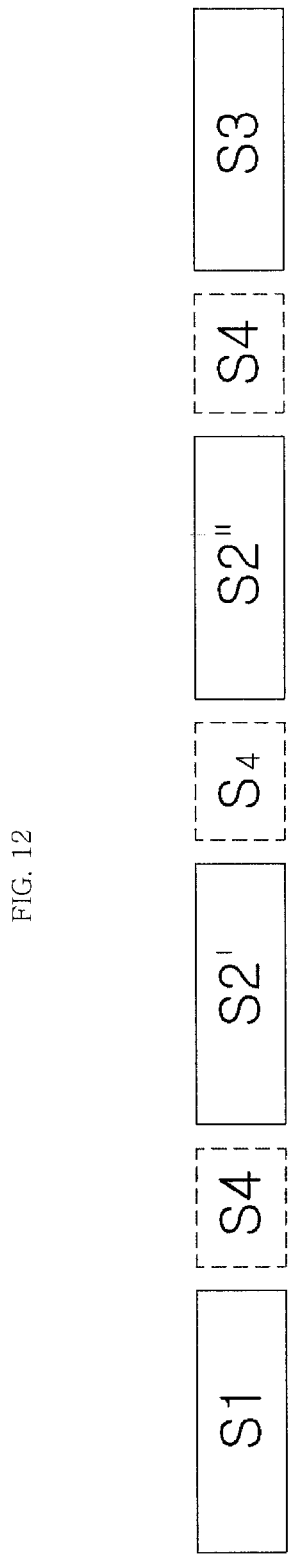
FIG. 12 is a conceptual diagram showing a further embodiment of part B of FIG. 9.

FIG. 12 is a conceptual view showing another embodiment of the transmission acoustic signal B of FIG. 9. Like reference numerals have been used to indicate like elements, and repetitive disclosure has been omitted.

Referring to FIG. 12, the controller 170 may control the conversion device 180 such that it dividedly outputs a second transmission acoustic signal B in a plurality of predetermined segments. The plurality of predetermined segments may be output separately according to product information and status information, or output separately based on output time. Further, the controller 170 may control the conversion device 180 to output a separation signal S4 during a dummy time T3 between the plurality of predetermined segments in order to separate the plurality of predetermined segments. The following description will focus on a case in which the plurality of predetermined segments are output separately according to product information and status information, which is applied in the same or similar way even in the case of outputting by unit time, as well as in the case of separate outputting according to product information and status information. However, embodiments are not limited to the above description, but may be applied to all cases of divided outputting in predetermined segments capable of effectively outputting the product information and status information.

That is, when the outputting of the second transmission acoustic signal B is started, the first transmission acoustic signal S1 is output. The first transmission acoustic signal S1 may be the same or similar to that described in FIG. 4. When the outputting of the first transmission acoustic signal S1 is completed, a separation signal S4 may be output during the time T3. Further, once the separation signal S4 is output during the time T3, a segment S2' corresponding to an operation information or stroke may be transmitted. Further, once the segment S2' corresponding to the operation information or stroke is transmitted, a separation signal S4 may be transmitted again to separate the plurality of predetermined segments. Once the separation signal S4 is output, a segment S2 corresponding to fault information may be transmitted. Once the transmission of the segment S2 corresponding to the fault information is completed, a separation signal S4 may be transmitted, and finally a third transmission acoustic signal S3 may be transmitted. Therefore, the laundry treatment machine 110 may dividedly output the product information and status information in the plurality of predetermined segments, thus preventing part of at least one transmission acoustic signal B from being damaged when output. Further, the laundry treatment machine 110 may output the corresponding segments alone when re-outputting the product information and status information, thereby making it possible to efficiently output the product information and status information.

Embodiments disclosed herein may automatically dividedly output product information and status information in response to an external command signal input from outside of the laundry treatment device 110. Further, the external command signal may include both an external command signals input through the selection device 150 by the user and an external command signal transmitted from the outside of the laundry treatment device 110 and received into an acoustic input device 252 discussed herein below.

Figure 13:
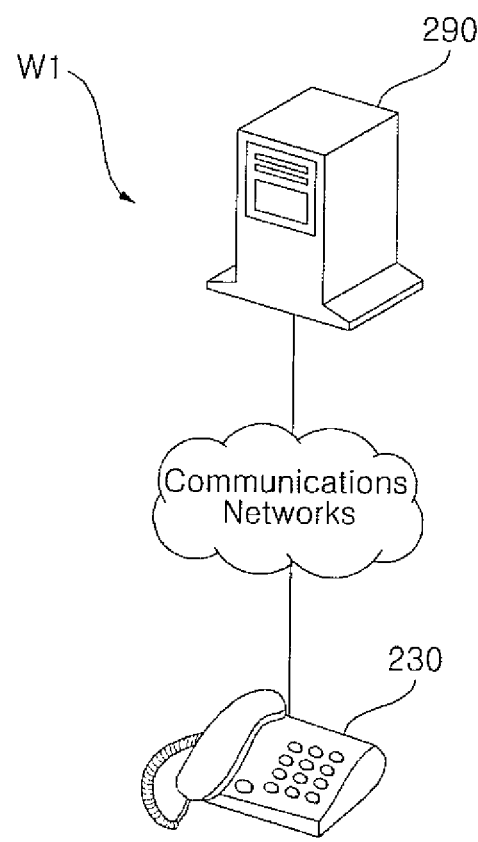
FIG. 13 is a perspective view showing an embodiment of a laundry treatment machine system W1 which is an embodiment of a home appliance system according to the present invention.
Figure 13:
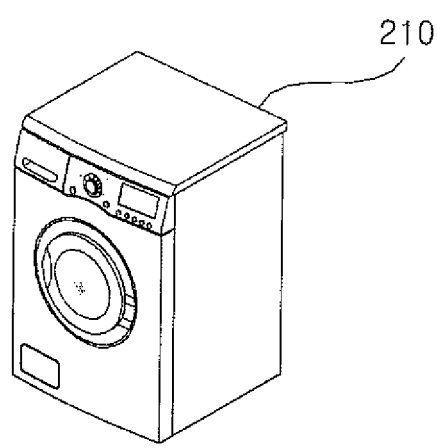
Figure 14:
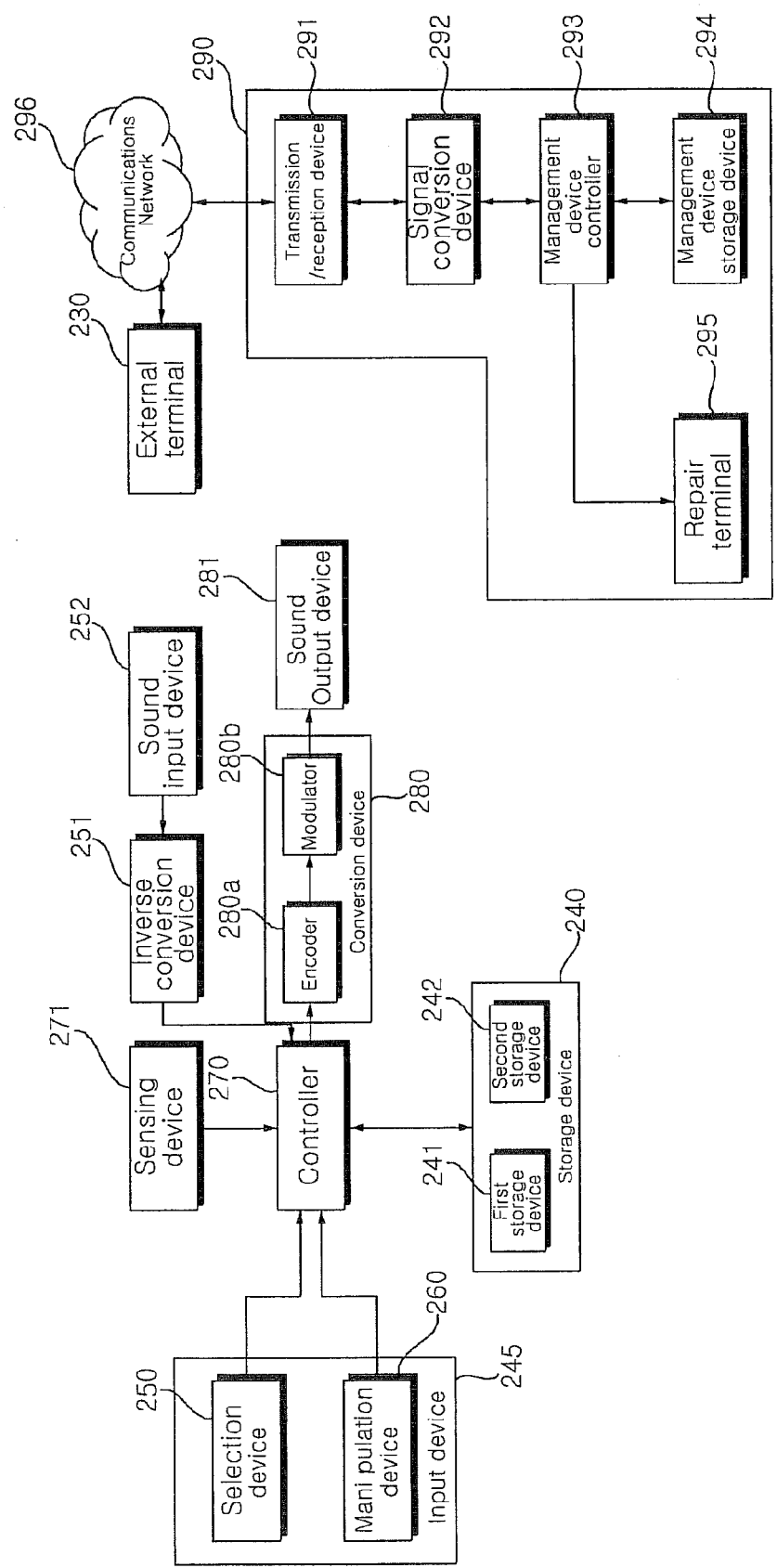
FIG. 14 is a block diagram showing a control flow of the laundry treatment machine system W1 of FIG. 13.

FIG. 13 is a perspective view of a home appliance system in the form of a laundry treatment machine system W1 according to an embodiment. FIG. 14 is a block diagram of a control flow of the laundry treatment machine system W1 of FIG. 13.

Referring to FIGS. 13 and 14, the laundry treatment machine system W1 may include a conversion device 280 that converts a second packet into at least one transmission acoustic signal and outputs the signal, a sound output device 281 that outputs a sound corresponding to the at least one transmission acoustic signal output from the conversion device 280 to the outside, a selection device 250 that receives input of an operation external command signal from the outside, and a controller 270 that performs control to divide a first packet into predetermined unit frames, encode the predetermined unit frames to generate the second packets, transmit the second packets to the conversion device 280, and dividedly transmit the at least one transmission acoustic signal output from the conversion device 280.

Further, the laundry treatment machine system W1 may further include an input device 245 configured to receive control commands from outside of the laundry treatment machine 210. The conversion device 280, the input device 260, the sound output device 281, and the controller 270 may be formed separately from the laundry treatment machine 210, or may be included in the laundry treatment machine 210. The input device 145 may further include a selection device 250 configured to receive input of an external command signal by a user.

The laundry treatment machine 210 may include the same or similar components as described in FIGS. 1 and 2. The management device 290 may include a transmission/reception device 291 configured to transmit and receive the sound output by the sound output device 281 of the laundry treatment machine 210, a signal conversion device 292 that inversely converts the sound received from the transmission/reception device 291 into the product information and status information, a management device controller 293 that reads the converted product information and status information, a management device storage device 294 that stores the product information and status information read by the management device controller 293, and a repair terminal 295 that transmits the product information and status information read by the management device controller 293 to a repairman.

A method for converting the product information and status information of the laundry treatment machine 210 into a transmission acoustic signal to output the same and outputting a sound corresponding to the transmission acoustic signal, and a control flow thereof are the same or similar to those as described with respect to FIG. 2. Further, a method for converting the product information and status information into a transmission acoustic signal is also the same or similar to those described with respect to FIGS. 11 and 12.

The sound output by the sound output device 281 may be transmitted to the management device 290 via a communications network 295. Further, the laundry treatment machine system W1 may further include an external terminal 230 connected to the management device 290 and the communications network 296. The external terminal 230 may include any device capable of transmitting the sound output from the sound output device 281, such as a wired phone, a wireless phone, or a mobile phone to the management device 290. The user may input the sound output from the sound output device 281 into the external terminal 230. In contrast to the description of FIG. 2, the sound input from the external terminal 230 may be converted into a voice signal, and the voice signal may be inversely converted into the product information and status information. The inversely-converted product information and status information may be compared with previously input data to be linked to the repairman.

That is, regarding the control flow of the management device 290, as described with respect to FIGS. 11 and 12, when the conversion device 280 outputs the transmission acoustic signal, the sound output device 281 may output a sound corresponding to the transmission acoustic signal. The output sound may be transmitted to the management device 290 through the external terminal 230 by the user. The transmitted sound may be received by the transmission/reception device 291. Meanwhile, the transmission/reception device 291 may be able to output the sound generated from the management device 290, as well as receive the sound. The received sound may be transmitted to the signal conversion device 292. In the transmission procedure, the sound may be converted into a transmission acoustic signal and transmitted. The transmission acoustic signal may be converted into the product information and status information in the signal conversion device 292. The procedure of converting the transmission acoustic signal may be done in a reverse manner to that described in FIGS. 2 to 4. The converted product information and status information may be transmitted to the management device controller 293. The management device controller 293 may store preset data therein. Therefore, the management device controller 293 may compare the preset data and the converted product information and status information. If it is judged that the converted product information and status information are different from the preset data, the management device controller 293 may transmit the converted product information and status information to the repairman through the repair terminal 295. Further, the management device controller 293 may store the converted product information and status information in the management device storage device 294. Therefore, a fault history or operation information of the laundry treatment machine 210 used by the user may be saved.

Meanwhile, the management device controller 294 may judge whether the converted product information and status information are correctly transmitted, as well as compare the converted product information and status information with the preset data. The converted product information and status information may be damaged by external factors as it is transmitted to the management device controller 294. If the management device controller 294 judges that the converted product information and status information are damaged, the management device controller 294 may transmit a re-transmit command indicating the damage of the converted product information and status information to the signal conversion device 293. The transmitted re-transmit command may be converted into a management device transmission acoustic signal corresponding to the re-transmit command in the signal conversion device 293. The converted management device transmission acoustic signal may be transmitted to the transmission/reception device 291. The transmitted management device transmission acoustic signal may be transmitted as a sound corresponding to the management device transmission acoustic signal to the laundry treatment machine 291 through the external terminal 230. The transmitted sound may be transmitted to an acoustic input device 252, such as a microphone, and the re-transmit command may be converted through an inverse conversion device 251 and transmitted to the controller 270. Upon receipt of the re-transmit command, the controller 270 may re-transmit the product information and status information to the conversion device 280. The re-transmitted product information and status information may be output again through the sound output device 281 in a reverse manner as that described in FIGS. 2 to 4. Therefore, even when damaged product information and status information are transmitted to the management device 290, the laundry treatment machine system W1 may be able to receive the re-transmit command and repetitively transmit correct product information and status information. Further, the laundry treatment machine system W1 may ensure correct repair of the laundry treatment machine 210 by correctly sending the product information and status information.

Meanwhile, the management device controller 293 may discriminate the order of the first transmission acoustic signal S1, the second transmission acoustic signal S2, and the third transmission acoustic signal S3. Further, the management device controller 293 may judge whether the second transmission acoustic signal S2 is damaged. If it is judged that the sequence of the first transmission acoustic signal S1, the second transmission acoustic signal S2, and the third transmission acoustic signal S3 is different from the previous input sequence, the management device controller 293 may output a re-transmit command through the transmission/reception device 291. When the re-transmit command is output, it may be transmitted to the inverse conversion device 251 through the acoustic input device 252. The re-transmit command transmitted to the inverse conversion device 251 may be converted into re-transmit information and transmitted to the controller 270. When the re-transmit information is transmitted to the controller 270, the controller 270 may control the conversion device 280 so as to re-output the plurality of transmission acoustic signals S1, S2, and S3 based on the re-transmit information. Even if the plurality of transmission acoustic signals S1, S2, and S3 generated in the laundry treatment machine 210 are damaged and transmitted to the management device 290, the user may re-transmit them by the re-transmit command so that correct product information and status information may be transmitted.

Meanwhile, the management device controller 293 may judge whether the second transmission acoustic signal S2 is damaged. If it is judged that the second transmission acoustic signal S2 is damaged, the management device controller 293 may output the re-transmit command in the same or similar manner as that described above. The re-transmit command may be input through the acoustic input device 252, and transmitted to the controller 270. Even if the second transmission acoustic signal S2 is damaged, the management device 290 may receive the second transmission acoustic signal S2 by re-outputting. Therefore, the product information and status information may be correctly transmitted to the management device 290 and make the management of the laundry treatment machine 210 easier. Moreover, even if the user may not judge whether the second transmission acoustic signal S2 is damaged, the second transmission acoustic signal S2 may be re-transmitted through the external command signal, thereby increasing user convenience.

Embodiments disclosed herein provide a home appliance, which dividedly outputs product information and status information, and a home appliance system, which receives and reads divided product information and status information and requests re-transmission of damaged product information and status information.

Embodiments disclosed herein provide a home appliance including a conversion unit or device that converts product information and status information into at least one transmission acoustic signal and outputs the same, an output unit or device that externally outputs a sound corresponding to the at least one transmission acoustic signal output from the conversion unit, and a control unit or controller that controls such that the at least one transmission acoustic signal output from the conversion device is dividedly output.

Further, embodiments disclosed herein provide a home appliance system, including a conversion unit or device that converts product information and status information into at least one transmission acoustic signal and outputs the same, an output unit or device that externally outputs a sound corresponding to the at least one transmission acoustic signal output from the conversion unit, a control unit or controller that controls such that the at least one transmission acoustic signal output from the conversion unit is dividedly transmitted, and a management device that receives the sound and inversely converts the sound into the product information and status information based on the sound.

The home appliance according to embodiments disclosed herein externally outputs product information and status information as at least one transmission acoustic signal to be divided. Even if part of the product information and status information is damaged, the corresponding part of the product information and status information may be output. Therefore, time and energy required to re-transmit the product information and status information may be saved. Meanwhile, the home appliance system according to embodiments disclosed herein may output an external command signal and receive damaged product information and status information from the home appliance if it is judged that the divided product information and status information are damaged as a result of reading. Accordingly, the home appliance system may manage the home appliance by receiving correct product information and status information, thereby increasing user convenience.

Any reference in this specification to one embodiment, an embodiment, example embodiment, etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance for a home appliance system that transmits product information to a management device via a communication network for fault diagnosis of the home appliance, and diagnoses a fault of the home appliance using the product information, the home appliance comprising:
    a selection device that receives input of an external command signal for executing a fault diagnosis from a user;
    a conversion device that converts product information into a plurality of acoustic signals and outputs the plurality of acoustic signals;
    a sound output device that outputs to outside of the home appliance a sound corresponding to the plurality of acoustic signal output by the conversion device;
    a storage device that stores the product information of the home appliance; and
    a controller that obtains the product information from the storage device, provides the product information to the conversion device, and controls the conversion device to output a start acoustic signal to inform the user that at least one acoustic signal corresponding to the product information is about to be output, and a main acoustic signal corresponding to the product information, upon receipt of the external command through the selection device, wherein the conversion device dividedly converts the product information into a first main acoustic signal, a second main acoustic signal, and outputs a separation signal during a dummy time between the first main acoustic signal and the second main acoustic signal, wherein each of the first and second main acoustic signals comprises:
        a first acoustic signal containing header information for the product information of the home appliance, including information identifying the home appliance, the first acoustic signal being recognized by an external device;
        a second acoustic signal output upon completion of the first acoustic signal and corresponding to the product information of the home appliance; and a third acoustic signal output upon completion of the second acoustic signal and indicating completion of the outputting of the product information.

2. The home appliance of claim 1, wherein the conversion device repeatedly outputs the second acoustic signal.

3. The home appliance of claim 1, wherein the controller further controls the conversion device to output an end acoustic signal that informs the user of the completion of the output of the main acoustic signal.

4. The home appliance of claim 2, wherein the separation signal is further provided between the second acoustic signals.

5. A home appliance system comprising the home appliance of claim 1, and further comprising a management device that receives the sound and inversely converts the sound into the product information.

6. The home appliance system of claim 5, wherein the management device comprises:
a transmission/reception device that transmits and receives a sound corresponding to the at least one acoustic signal;
a signal conversion device that inversely converts the sound into the product information and outputs the same based on the at least one acoustic signal corresponding to the sound transmitted from the transmission/reception device; and
a management device controller that reads the inversely converted product information.

7. The home appliance system of claim 6, further comprising:
a management device storage device that stores the product information of the home appliance read by the management device controller.

8. The home appliance system of claim 6, wherein the product information of the home appliance read by the management device controller is transmitted to a repairman.

9. The home appliance system of claim 5, further comprising:
an acoustic input device configured to receive a sound corresponding to an acoustic signal output by the management device; and
an inverse conversion device that inversely converts the sound input into the acoustic input device into a re-transmit command, wherein if the sound is input into the acoustic input device from the management device, the inverse conversion device inversely converts the re-transmit command and dividedly transmits the at least one acoustic signal output from the conversion device based on the re-transmit command.

10. The home appliance system of claim 5, wherein the product information includes status information for the home appliance.

* * * * *